US012526662B2

United States Patent
Klotsche et al.

(10) Patent No.: US 12,526,662 B2
(45) Date of Patent: Jan. 13, 2026

(54) PAIRING OF USER DATA FLOWS

(71) Applicant: Nokia Solutions and Networks Oy, Espoo (FI)

(72) Inventors: Ralf Klotsche, Neuenburg (DE); Bernd Haberland, Stuttgart (DE)

(73) Assignee: Nokia Solutions and Networks Oy, Espoo (FI)

( * ) Notice: Subject to any disclaimer, the term of this patent is extended or adjusted under 35 U.S.C. 154(b) by 567 days.

(21) Appl. No.: 17/795,257

(22) PCT Filed: Jan. 28, 2020

(86) PCT No.: PCT/EP2020/052013
§ 371 (c)(1),
(2) Date: Jul. 26, 2022

(87) PCT Pub. No.: WO2021/151467
PCT Pub. Date: Aug. 5, 2021

(65) Prior Publication Data
US 2023/0056256 A1    Feb. 23, 2023

(51) Int. Cl.
*H04W 24/08*    (2009.01)
*H04B 7/0452*   (2017.01)
*H04L 5/00*     (2006.01)

(52) U.S. Cl.
CPC .......... *H04W 24/08* (2013.01); *H04B 7/0452* (2013.01); *H04L 5/0007* (2013.01)

(58) Field of Classification Search
CPC ... H04W 76/27; H04W 72/23; H04W 72/541; H04J 11/005; H04L 1/0003; H04B 7/0452
See application file for complete search history.

(56) References Cited

U.S. PATENT DOCUMENTS 10,225,724 B1 *   3/2019   Pawar .................. H04W 76/10
2011/0044262 A1 * 2/2011   Satapathy ......... H04W 28/0268
                                                      370/329
(Continued)

FOREIGN PATENT DOCUMENTS

CN    103748943 A    4/2014
CN    107210833 A    9/2017
(Continued)

OTHER PUBLICATIONS

3rd Generation Partnership Project; Technical Specification Group Radio Access Network; Study on new radio access technology: Radio access architecture and interfaces (Release 14), 3GPP TR 38.801, V14.0.0, Mar. 2017, pp. 1-91.
(Continued)

*Primary Examiner* — Mahran Y Abu Roumi
(74) *Attorney, Agent, or Firm* — Nokia Technologies Oy (57) ABSTRACT

It is provided a method, including monitoring if an information on a first pairing condition is received, wherein the first pairing condition indicates that a first flow is suitable for pairing under the first pairing condition; checking, if the information on the first pairing condition is received, for at least one of one or more stored second pairing conditions, if the respective stored second pairing condition matches the first pairing condition, wherein each of the one or more second pairing conditions indicates that a respective second flow different from the first flow is suitable for the pairing under the respective second pairing condition; pairing the first flow and one of the second flows if the second pairing condition related to the one of the second flows matches the first pairing condition.

16 Claims, 7 Drawing Sheets

(56) References Cited

U.S. PATENT DOCUMENTS

| | | | |
|---|---|---|---|
| 2011/0044272 A1* | 2/2011 | Cui | H04B 7/0452 |
| | | | 370/329 |
| 2013/0136011 A1* | 5/2013 | Tardo | H04L 63/1416 |
| | | | 370/252 |
| 2016/0128025 A1* | 5/2016 | Zhang | H04W 76/27 |
| | | | 370/329 |

FOREIGN PATENT DOCUMENTS

| | | |
|---|---|---|
| EP | 2288049 A2 | 2/2011 |
| WO | WO-2015/139772 A1 | 9/2015 |

OTHER PUBLICATIONS

Notice of Allowance received for corresponding Chinese Patent Application No. 202080098124.1, dated Jun. 7, 2024, 4 pages of Notice of Allowance and no page of translation available.

Office action received for corresponding European Patent Application No. 20702452.2, dated Jan. 30, 2025, 10 pages.

\* cited by examiner

PAIRING OF USER DATA FLOWS

CROSS REFERENCE TO RELATED APPLICATION

This patent application is a U.S. National Stage application of International Patent Application Number PCT/EP2020/052013 filed Jan. 28, 2020, which is hereby incorporated by reference in its entirety.

FIELD OF THE INVENTION

The present invention relates to pairing of user data flows. In particular, the present invention relates to pairing of user data flows in case of MuMIMO and/or CoMP.

Abbreviations

3GPP $3^{rd}$ Generation Partnership Project
5G $5^{th}$ Generation
5QI 5G QoS Indicator
AI Artificial Intelligence
BE Best Effort (a transmission quality without any guarantee typically offer for IP traffic)
BW Bandwidth
CoMP Coordinated Multipoint
DRX Discontinuous Reception
DU Distributed Unit
eCPRI evolved Common Public Radio Interface
FD Frequency domain (used in the context of the RAN air interface resource (PRB) scheduler)
FD/SD Frequency Domain and Spatial Domain
FFT Fast Fourier Transformation
GBR Guaranteed Bitrate
iFFT inverse FFT
IP Internet Protocol
L1, L2 Layer 1 (=PHY), Layer 2 (=data link layer) of OSI stack
(Mu)MIMO (Multi user) Multiple Input Multiple Output
NRT Non-Realtime
OSI Open Systems Interconnection
PHY Physical Layer (=L1)
PHY-H Physical Layer, higher part
PHY-L Physical Layer, lower part
PRB Physical Resource Block (seen as the smallest chunk of resource for free choice of scheduling)
QoS Quality of Service
RAN Radio Access Network
RT Realtime
SD Spatial Domain
SLA Service Level Agreement
TCP Transmission Control Protocol
TD Time Domain
TTI Transmission Time Interval
UE User Equipment
URLLC Ultra-Reliable Low-Latency Communication
Vol P Voice over IP
VRAN Virtualized RAN PHY-H, the higher part of the PHY layer, may contain only functionality related to the individual flows. Depending on the number of antennas (low number) MIMO antenna processing may be included. It represents the upper part according eCPRI interfaces 7.1, 7.2 or 7.3.

PHY-L, the lower part of the PHY layer, may contain all functionality belonging to the cell (as e.g. (I)FFT) in case of massive MIMO it is beneficial to place antenna mapping on this side of the processing chain. Details are described in the standards as split 7.1, 7.2, 7.3 [see 3GPP TS 38.801].

BACKGROUND OF THE INVENTION

Generally, multi user MIMO can be applied if all of the following conditions are fulfilled:
1. several antennas on transmit and receive side can be used by UE1 and offer serval (spatial independent) paths to spread the information using a set of frequencies (bundled in PRBs [Physical Resource Blocks]) and,
2. Not all paths are useful for transmission, and
3. Another UE 2 can use the same set of frequencies (or a subset or a superset, at least something with an intersected set), and
4. The UE 2 can also transmit on several paths and
5. The paths used by UE1 and UE2 are orthogonal (will not interfere while transmission)

The information to perform this in 4G and 5G radio is typically coded in so called 'code books', where the paths are represented by matrixes with pre-defined coefficients (these coefficients provide already orthogonal paths). The matrix to be chosen, the rank of the matrix, and so forth is exchanged in control protocols.

Multi user MIMO (MuMIMO) boost BW usage by pairing flows of users on a shared air interface resource. Currently, pairing is decided per scheduled transmission slot (e.g. TTI) so pairing is executed often. The paired flows use the same time and frequency resources (typically: the same PRBs) for transmission over the air interface. For example, paired flows may use orthogonal symbols for transmission. In general, whether or not two flows are suitable for pairing may be decided based on properties of the precoding/beamforming codebooks.

Pairing is by its nature a combinatory problem with an algorithm-complexity of 'n over k' (select k flows to be paired among a total of n flows) which results in $$\binom{n}{k} = \frac{n!}{k! \cdot (n-k)!}$$

options, and even small sets of paired flows per TTI (typically 2 . . . 4 paired flows) cause a tremendous calculation effort.

Beside the computational complexity described above, which is a problem by itself, there are further problems:

A second problem is the packet-oriented nature of the data flows generated by the individual users. If the arriving packets are served instantaneously, the MU-MiMO pairing situation is constantly changing due to jitter on the IP layer of the core network and higher OSI layers such as the application layer. Here, the term "pairing situation" describes whether or not the two data flows are suitable for pairing because they may use the same time resource. Pairing uses the existing buffers to generate a perfect match of time resources.

A third problem emerges from novel slicing technologies, where the processing of the flows by the slices shall be kept in an encapsulated way to allow the co-existence of slices in a safe way. According to a VRAN strategy, the scope of the slices may be widened into the real time domain of the 3GPP 5G stack deep into the physical layer. Even the DU functionality may be network slice dedicated and distributed across several data centers.

The slices and functional components can be distributed in a cloud spread over different locations. The slices may be 'Local', also known as 'on premises cloud', or 'Central' also known as a '(far) edge cloud'. The characteristics of each slice raises requirements which may limit the place of its components in the cloud. E.g., the required round trip time of an URLLC slice is so small, that placement can only be performed on an "on premises cloud" together with the related applications. Each slice may encompass several users with their bearers, and each of these bearers is expected to own a separate queue. Transmission of the packets of the queue will be controlled by a scheduler.

A relatively new architecture provides a split scheduler: A Frequency Domain (FD)/Spatial Domain (SD) Scheduler as an entity shared between all slices with a resource scope of e.g. a cell and a set of Time Domain (TD) schedulers, wherein a TD scheduler is assigned to each slice instance and type.

Figure 1:
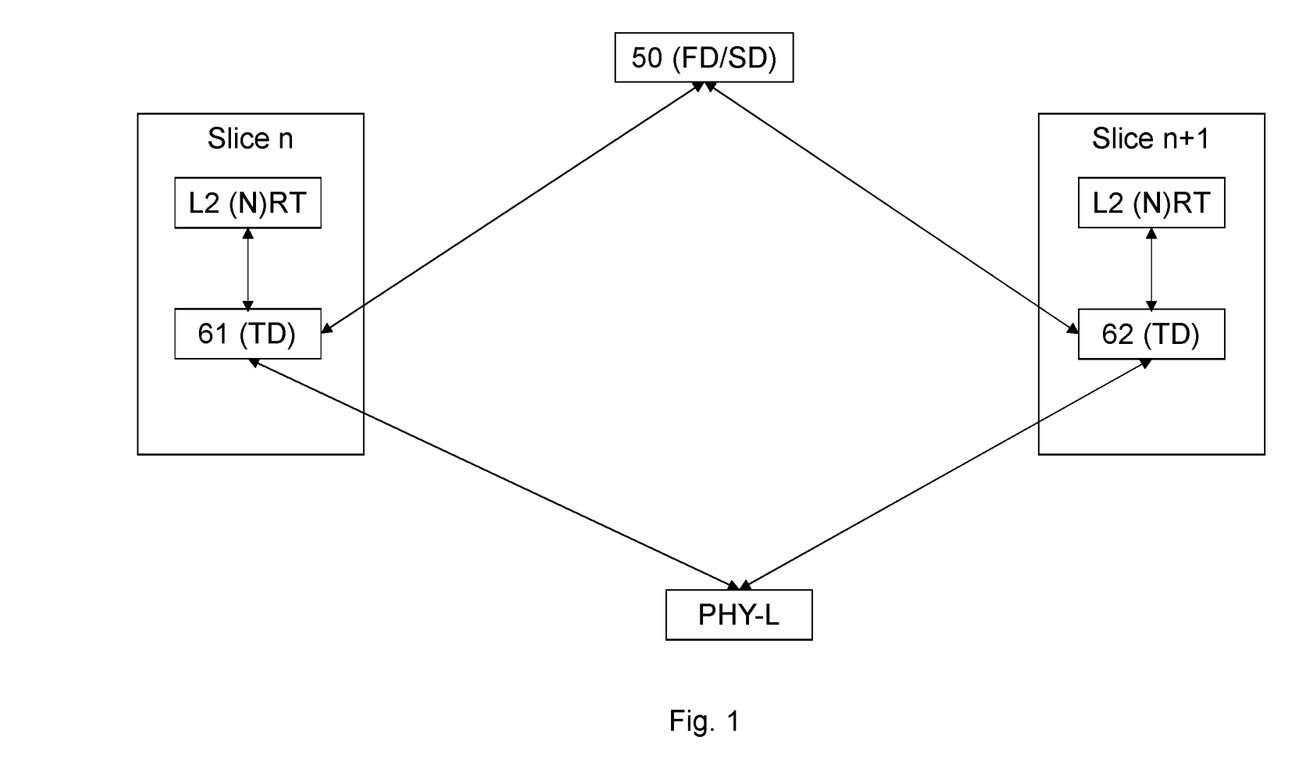
FIG. 1 depicts a conventional "split scheduler" architecture.

FIG. 1 shows an example of such an architecture. There is a FD/SD scheduler 50 common to plural slices such as slice n and slice n+1 shown in FIG. 1. Each slice comprises a respective TD scheduler (61 and 62 in FIG. 1). The FD/SD scheduler 50 grants a frequency/spatial resource upon request from the respective TD scheduler 61, 62 in order to transport the flow from layer 2 of the respective slice. Layer 2 may be realtime (RT) and/or non-realtime (NRT). The TD scheduler grants a time resource for the flow from layer 2 such that FD/SD scheduler 50 and TD scheduler 61,62 jointly provide a time and frequency (e.g. a PRB) and a spatial resource to the flow. The flow from layer 2 is then further processed by the lower physical layer (PHY-L) on the granted time, frequency and spatial resource.

SUMMARY OF THE INVENTION

It is an object of the present invention to improve the prior art.

According to a first aspect of the invention, there is provided an apparatus, comprising means for determining configured to determine whether or not a flow is suitable for pairing and to determine a pairing condition under which the flow is suitable for pairing; means for informing configured to inform a pairing scheduler on the pairing condition if the flow is suitable for pairing.

According to a second aspect of the invention, there is provided an apparatus, comprising means for monitoring configured to monitor if an information on a first pairing condition is received, wherein the first pairing condition indicates that a first flow is suitable for pairing under the first pairing condition; means for checking configured to check, if the information on the first pairing condition is received, for at least one of one or more stored second pairing conditions, if the respective stored second pairing condition matches the first pairing condition, wherein each of the one or more second pairing conditions indicates that a respective second flow different from the first flow is suitable for the pairing under the respective second pairing condition; means for pairing configured to pair the first flow and one of the second flows if the second pairing condition related to the one of the second flows matches the first pairing condition.

According to a third aspect of the invention, there is provided a method, comprising determining whether or not a flow is suitable for pairing and to determine a pairing condition under which the flow is suitable for pairing; informing a pairing scheduler on the pairing condition if the flow is suitable for pairing.

According to a fourth aspect of the invention, there is provided a method, comprising monitoring if an information on a first pairing condition is received, wherein the first pairing condition indicates that a first flow is suitable for pairing under the first pairing condition; checking, if the information on the first pairing condition is received, for at least one of one or more stored second pairing conditions, if the respective stored second pairing condition matches the first pairing condition, wherein each of the one or more second pairing conditions indicates that a respective second flow different from the first flow is suitable for the pairing under the respective second pairing condition; pairing the first flow and one of the second flows if the second pairing condition related to the one of the second flows matches the first pairing condition.

Each of the methods of the third and fourth aspects may be a method of pairing.

According to a fifth aspect of the invention, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the invention, at least one of the following advantages may be achieved:

Unload the FD/SD scheduler from (too frequent) pairing decisions
  Allow pairing processing asynchronously after the PRB assignment when answering with separate messages)
  Spend more time to solve the n over k problem
Detect pairing situation with a potential to last for a time >1TTI derived from
  SLA for delay budget
  Service type (e.g. streaming video)
  Mobility situation (nomadic, sharing the same vessel, etc)
  Expected data rates
  Channel condition and the related reserves that allow sharing
Improving the pairing situation for many TTIs by queueing the data
  getting bigger chunks of data in the multi user situation
  Synchronize streams to keep the pairing situation
  Good candidate service: e.g. streaming video: A lot of data, constant stream characteristic, jitter tolerant, large volume in web-traffic
Allow the coordination of processing in a cloud environment (especially for CoMP)
  Beyond the scope of one slice
  Each slice may allow (or not) if the related L1 processing steps will be executed in one shared module, where the more restrictive one enforces the placement
  FD/SD scheduler may trigger the provisioning of such a shared resource or
It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

For example in the case of multiuser MIMO, pairing of flows from (potentially different) users considering their channel conditions and orthogonality is advantageous. In order to increase the number of paired flows, it is favourable to decide the pairing over plural slices (e.g. by the FD/SD scheduler) and not separately per slice. Pairing per slice will obtain suboptimal results, because each slice owns its own TD scheduler but deals only with a subset of users. Thus, each TD scheduler in a set of slices serving a cell has a limited view on the overall situation in the cell.

Some example embodiments of the invention leverage the potential of the split of FD/SD scheduler and TD schedulers, where several TD schedulers operate on one FD/SD scheduler. In detail, some example embodiments provide a pairing scheduler taking care of pairing of flows over several slices. The TD scheduler may be integrated with the FD/SD scheduler of the conventional architecture of FIG. 1 or separate from the FD/SD scheduler.

Figure 2:
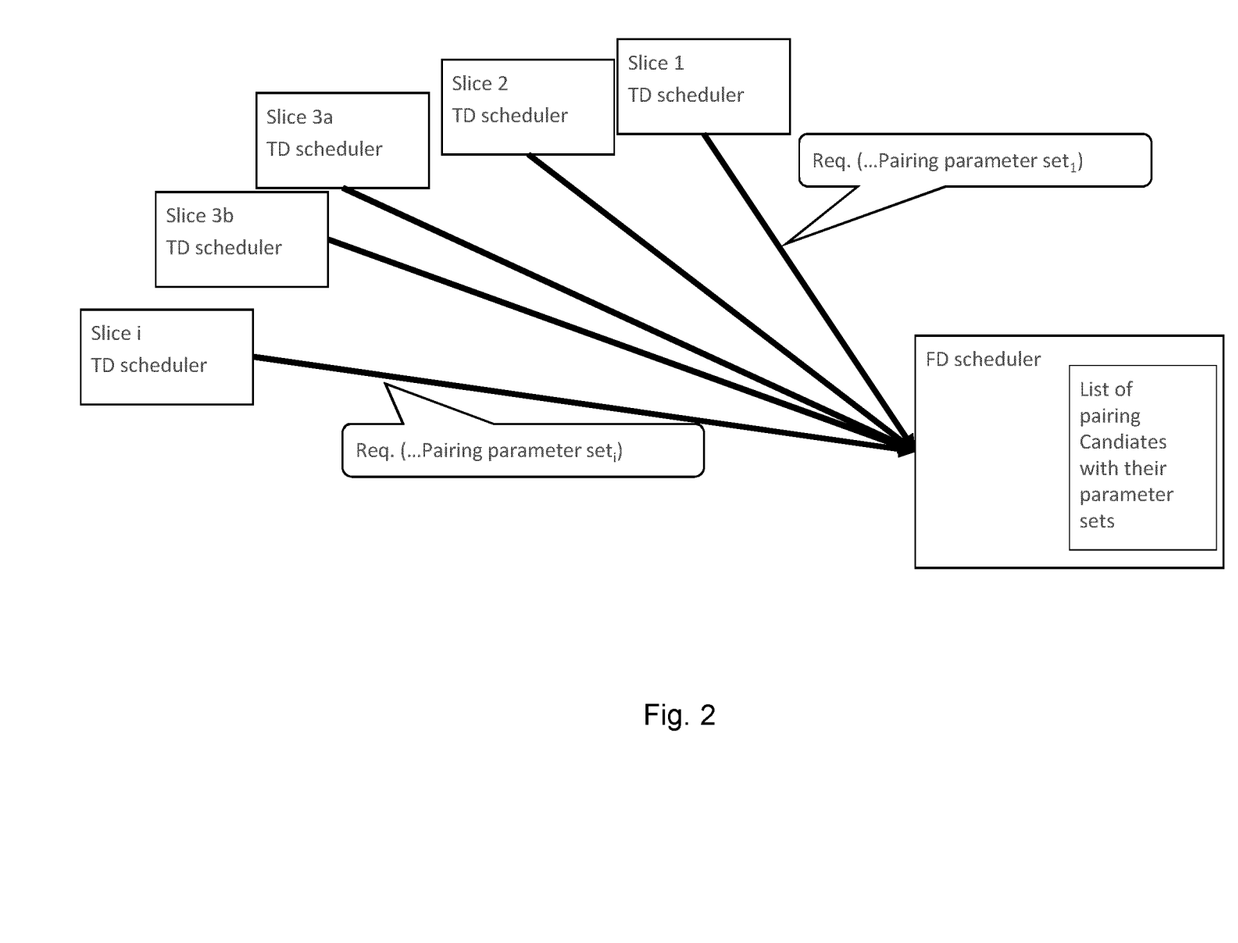
FIG. 2 shows interworking of TD scheduler, pairing scheduler, and FD/SD scheduler according to some example embodiments of the invention.

In detail, as shown in FIG. 2, each slice comprises its own TD scheduler. These TD schedulers provide their pairing requirement (pairing condition) to the pairing scheduler which may or may not be incorporated in the common FD/SD scheduler. The pairing requirements (pairing conditions) may comprise a set of pairing parameters defining a condition under which pairing is feasible. One slice may be spread out on several independent entities (called vBBU, Virtual Base Band Unit) each containing its own TD scheduler. Slice 3 is an example for e.g. a heavy Mobile Broadband Slice which is realized by 2 entities (slices 3a and 3b). This option has several advantages with respect to resilience or usage of computing resources.

Figure 3:
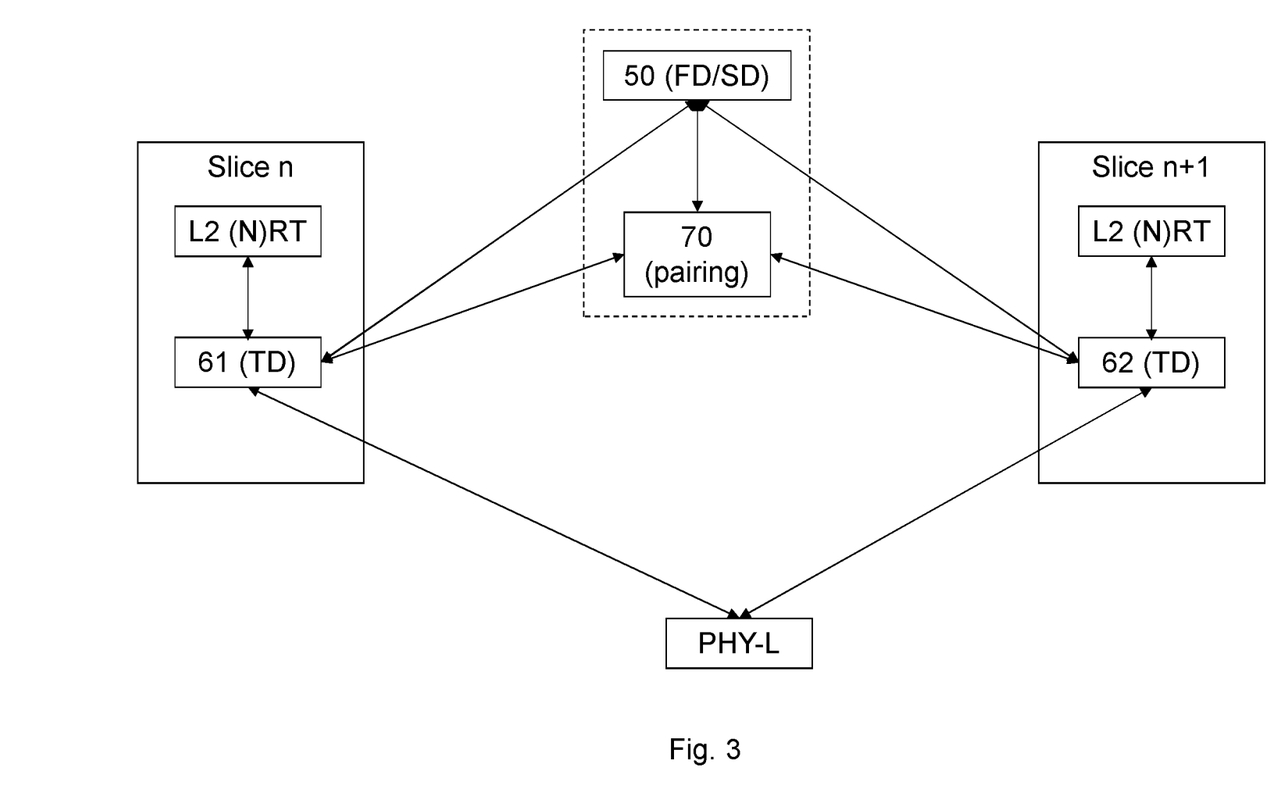
FIG. 3 shows a scheduler architecture according to some example embodiments of the invention.

FIG. 3 corresponds to FIG. 1, wherein the pairing scheduler 70 is additionally shown. The pairing scheduler receives the requirements (pairing conditions) from the TD schedulers and informs both the common FD/SD scheduler and the involved TD schedulers if two or more flows are to be paired. The communication of the pairing scheduler with the FD/SD scheduler and the TD schedules may be standardized or proprietary.

The pairing conditions may be derived e.g. from the packet queues of the bearers carrying the flows. The queue of each bearer resides in one of the slices which handles the assigned type of service together with the slice's TD scheduler. Many of today's QoS flows, which are transported on their related bearer, show a quite regular pattern of packet interarrival. Longer TCP transmission (e.g. from a file transfer) can be shaped into a regular pattern. The pairing condition may be derived from such a regular pattern.

Some example embodiments of this invention do not require a strictly regular pattern (as known e.g. from GBR services or VoIP) in order to determine a pairing condition. For these example embodiments, a certain degree of co-incidence is sufficient. For example, 3GPP defines different QoS classes for the various services with the so called 5QI values indicating a QoS class. A part of the QoS class specification is the allowed end-to-end delay. The pairing scheduler can use a part of this delay budget to synchronize bearers which show a good pairing condition. Whenever two or more flows with a pairing condition have data in the buffer at the same TTI, pairing can be used to save air interface resources. If one of those bearers has a rate which is not matching to the others, it will empty its queue without pairing. The same also applies to the channel conditions, because in a pairing situation each bearer will experience its own data rate although all are using the same PRBs. The QoS of the flows may be signalled or detected by other means, e.g. by deep packet inspection (looking at the data if not encrypted) or AI looking at the traffic pattern as such.

According to some example embodiments of the invention, the communication between TD and FD/SD scheduler (or a separate pairing scheduler) is extended by the information characterizing the QoS of the flow and the options to adapt the transmission of the flow. Thus, the FD/SD scheduler is enabled to adapt the timely reaction of future TD scheduling events and to decide synchronous transmissions of good pairing candidates.

Figure 4:
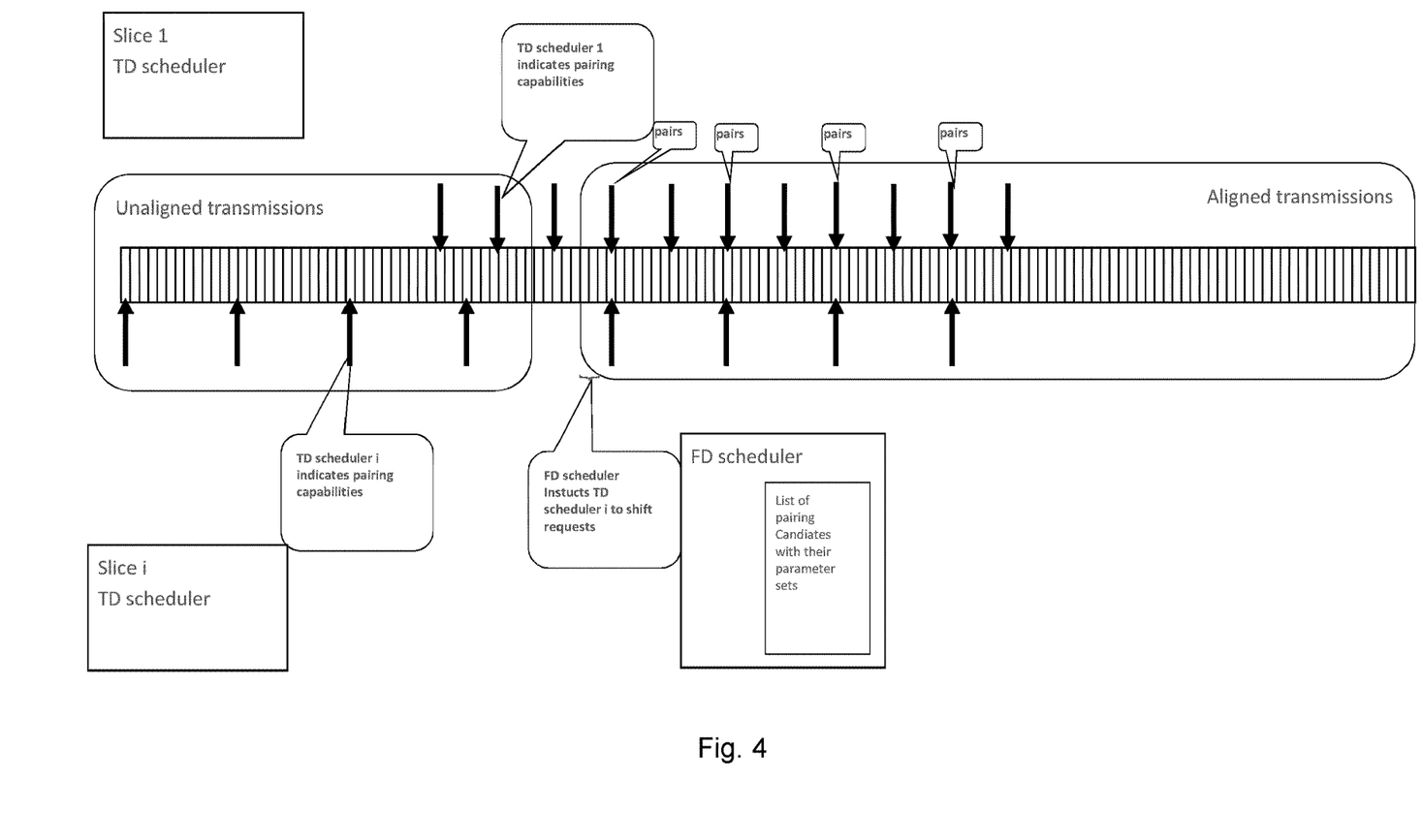
FIG. 4 shows a transmission timing of two flows according to some example embodiments of the invention.

The transmission of the flow may be adapted as follows: The service characteristics as described e.g. by the 5QI may allow a delay budget. This delay budget is used proactively to pair two or more flows. This is shown in FIG. 4 showing a timing of transmissions of two flows (upper flow and lower flow) of two different slices (slice 1 and slice i). At the beginning (left side), the transmissions are not aligned. If the pairing scheduler decides to pair these flows, it may instruct the TD scheduler of one of the flows (the lower flow in FIG. 4) to delay its transmission such that the transmission is synchronous with the transmission of the upper flow. The acceptable delay is indicated by the delay budget. Note that, in this example, the bottom flow has less transmissions per time unit than the upper flow. Therefore, a paired (synchronous) transmission takes place at only every second transmission of the upper flow.

From a conceptual point of view, some example embodiments of the invention provide a transition from incidental pairing to managed pairing. The pairing scheduler may store all pairing offers offered (in other words: pairing conditions sent) by the TD schedulers to use them for future pairing decisions until an update of the respective pairing offer. Such an update may be triggered because the respective service condition (e.g. the QoS requirement of the service can vary over time), channel condition, and/or mobility condition (nomadic, sharing the same vessel, etc.—changing the coherence time of the radio channel) changes. If a new pairing candidate shows up at the pairing scheduler by indicating its pairing condition, the pairing scheduler may consider all stored potential pairing candidates, if they are feasible for pairing with the new candidate. The new candidate gets its pairing decision quickly because its pairing condition has to be compared with the n stored pairing conditions only. Thus, the combinatory calculation effort problem is softened. The pairing partner(s) (i.e. the respective TD schedulers) are notified to synchronize future packet arrival events.

In 5G networks, the characteristics of a packet flow is either known (e.g. by the assigned 5QI value) or may be learned on the fly. E.g., packets of a streaming video in a Best Effort IP service may be identified by their 'five Tuple' (source and destination addresses, next header, source and destination ports). Other flows may be identified because they use a well known port (e.g. port 8080 for a web session). From the time behaviour of the identified packets of the flow, the time characteristics may be learned. Until learning has reached a satisfactory level, these flows are not paired.

In some cases, it is expected that the interarrival pattern of the flow shows some regularities. E.g. streaming video fills it's play out buffer with bursts which have a quite repetitive timing, but vary in size. The timing can be aligned.

Video conference also show regular patterns generated by the codec. In this case the bursts are way smaller (2-5 IP packets) more frequent and showing a many fold shape: By the P-, B-, and I frames. See https://de.wikipedia.org/wiki/Bildergruppe.

If a packet interarrival pattern of a flow is expected to show some regularities or if such regularity is learned as described above, some example embodiments of the invention may assign a QoS class (as defined e.g. by the 5QI) to the flow and, thus, derive a time budget for pairing synchronization.

The TD scheduler of the slice publishes to a central instance of a 'pairing scheduler' (e.g. collocated or even embedded in FD/SD scheduler) the flexibility per bearer to align for pairing. I.e., the TD scheduler defines its individual view of pairing potentials (pairing conditions) and informs the pairing scheduler thereabout. The pairing conditions may comprise one or more of Rank and channel information which may be used or shared
Interference which may be acceptable
Expected packet sizes and data rates
Allowed additional jitter (corresponding to a time budget) to be used to synchronize pairing Others . . . .

The TD scheduler may obtain rank and channel information and acceptable interference from control plane information exchanged between UE and the cell. It may obtain the expected packet sizes and data rates and the allowed jitter from signalling in the signalling plane or measurement. The TD scheduler may use mobility information of the UE to determine its pairing offer. Typically, TD scheduler does not offer pairing of a flow of a moving user because the channel condition may frequently change. Also, in case of handover of a UE, TD scheduler will typically not offer pairing of a flow of this UE.

The pairing scheduler may search and build associations that last potentially for a while, e.g.

DRX and other means to synchronize the data queue handling of potential candidates, and thus the time of transmission on the air interface,
Build up (if allowed by SLA) the queue slightly to have 'data on demand' to transmit,
Handle the controlled pairs with a common (boosted) priority considering QoS, SLA, and "Proportional fair" (Pf, see https://en.wikipedia.org/wiki/Proportionally-_fair).

This way a pairing association may be kept alive until the channel conditions, the service usage, or the mobility situation changes.

The pairing scheduler can be realized in two ways:
embedded in the FD/SD scheduler, for each TTI running ahead of the respective per TTI scheduling. Thus, it enables instantaneous reaction on newly detected pairs. (running synchronously enabling incidental per TTI pairing)
Running asynchronously after the FD/SD scheduler for each TTI but fed with all new pairing candidates detected in the latest TTI. This way incidental per TTI paring is not possible, but the compute resources may be used more efficiently. A new pairing may start at the next TTI, right after the synchronisation of the queues in the slices via the related TD schedulers.

In the following the synchronous way is detailed, because it is the more complex but also more performant way. The asynchronous path can easily be derived therefrom. The asynchronous path may be seen as an initial step of implementation, because it does not put addition burden on the FD/SD scheduler.

In the architecture with a TD scheduler per slice and a common FD/SD scheduler, the queues of each bearer are under the control of the TD scheduler. Hence, the TD scheduler takes the role of the execution part of some example embodiments of this invention by controlling the queues (i.e., by adequately delaying packets for pairing. These slice specific TD schedulers have only a limited scope on all the potential pairs. In contrast, the pairing scheduler is a central instance where all pairing information is available. Thus, the pairing scheduler is the decision part of some example embodiments of the invention: It assigns pairs considering the air interface conditions of the reporting flows and moderates the queuing conditions to keep the pair together as long as reasonable.

Figure 5:
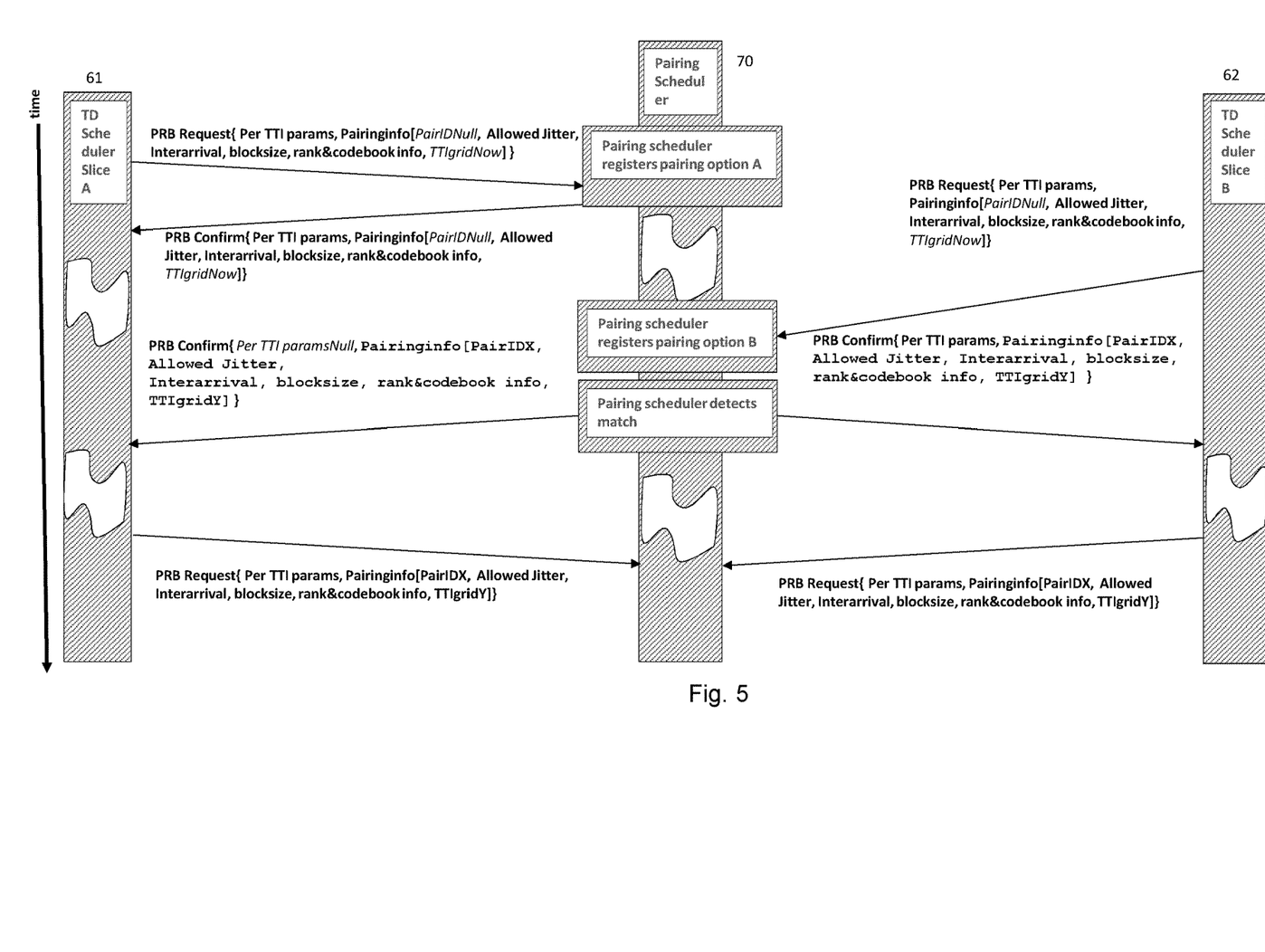
FIG. 5 shows a sequence diagram of a communication according to some example embodiments of the invention.

FIG. 5 shows a sequence diagram of the communication of the TD schedulers 61, 62 of two different slices (slice A on the left side, slice B on the right side) and their common pairing scheduler 70 (in the middle). The pairing scheduler 70 may be embedded with the common FD/SD scheduler or stand-alone. For efficiency reasons the pairing information is piggybacked onto the PRB request/confirmation messages which is anyhow passed to and from the pairing scheduler. Of course, in other example embodiments of the invention, pairing messages separate from the PRB request/confirmation messages may be used. For simplicity, in the example of FIG. 5, request and confirm message have the same structure.

As shown in the example communication of FIG. 5:
The TD scheduler of slice A derives from the given channel conditions, QoS history of the bearer, and the expected demand for BW that pairing is possible. So, the TD scheduler 61 of slice A provides to the pairing scheduler 70 a pairing info element indicating that pairing is possible and its own flexibility to adapt the transmission to be part of a pairing scheme (in other words: its pairing condition). In some example embodiments, providing a pairing condition may imply that pairing is possible such that the latter information may not be sent explicitly. The pairing condition may comprise e.g. one or more of the allowed jitter, the inter-arrival time, block size, and rank & codebook information. (Null' parameters are not yet set, because it does not fit to the role of the sending entity, or the desired information is not yet available). In the example of FIG. 5, the pairing condition is sent as part of the PRB request.

At that time, the pairing scheduler 70 cannot find a partner for the flow, so it delivers back a Nulled pair ID in the response to the TD scheduler 61 of slice A (here: in PRB confirm message). The pairing scheduler 70 stores the pairing condition provided by the TD scheduler 61 of slice A.

Later the TD scheduler 62 of slice B sends a PRB request with pairing conditions, too. The pairing scheduler 70 detects that the flow of slice B can be paired with the flow of slice A because the pairing conditions match.

The matching condition is given if all the following criteria are fulfilled ("ideal matching condition") which are: A sufficiently big overlap of PRBs to be used, a set of orthogonal paths, enough time budget to align the both queues to be scheduled in the future in the same TTI in each involved TD scheduler, enough throughput for each bearer in its subset of orthogonal paths. Thus, the pairing scheduler 70 assigns a PairID, and dimensions the block size, jitter, codebook entries etc. and TTI grid to be used for the synchronization of the queues to the pair (pairing information).

Slice B gets the pairing information with the granting message (PRB confirm). Thus, TD scheduler 62 of slice B operates according to the pairing information.

Slice A gets a blind granting message (Nulled Grant) to get informed on the pairing information such that the TD scheduler 61 of slice A operates according to the pairing information, too.

In some example embodiments, the pairing scheduler 70 may pair two flows even if some of the above matching conditions do not fulfil the ideal matching condition. For example, the pairing scheduler 70 may pair two flows if none of the criteria deviates from the respective ideal matching condition by more than a respective predefined threshold. In the case of the ideal matching condition, the threshold is 0 for all the criteria. As another example, the pairing scheduler 70 may pair two flows if not more than a predefined number of the criteria of the ideal matching condition are not fulfilled. In an extreme example, the pairing scheduler 70 may pair two flows if at least one of the criteria is fulfilled or even if it does not deviate from the respective ideal matching condition by more than the predefined threshold.

TTI grid is meant here as set of data elements that define the time related aspect of the synchronized operation, (i.e., when the TD scheduler of a paired flow may provide its pairing condition to the pairing scheduler again). The TTI grid is defined by starting TTI and an offset to be used in a repetitive way (instead of a simple offset a pattern may be defined alternatively).

It may reuse the DRX to reuse and combine energy saving feature of the UE with pairing or define directly TTI grid mapped to the TTI counter known to all involved components. One easy implementation of this grid can be represented by 2 discrete numbers used as the remainder of a modulo function on the TTI counter. It shall be interpreted as the couple [GridStep, GridOffset] and the meaning for the related TD schedulers is (in pseudo C-code):

If (TTIcounter % GridStep==GridOffset)
 sendNextGrantRequest(<considering all pairing information items>);

% is the modulo operator in C programming language. sendNextGrantRequest is indicated here for a case that the pairing condition is piggypacked with the grant request.

This tiny algorithm combines several advantages:
 It coordinates the TD schedulers handling a given pair
 It allows to distribute various pairs on the TTI time scale.
 It interferes with a slice specific scheduling strategy in a very limited and controllable way.

The parameter GridStep is dependent on the flexibility a given service flow offers and is therefore limited by the offering TD scheduler (e.g. by packet interarrival time and allowed burst size). GridOffset is a free choice for the pairing scheduler. A limitation is caused by the algorithm itself because it must be reachable by the modulo function so the interval 0<=GridOffset<GridStep is valid. The FD/SD scheduler may use the degree of freedom in the choice of GridOffset to balance the effort to process paired flows over time and available computing resources.

Planning and scheduling long(er) term pairing conditions offer the opportunity to implement strategies. The dimensioning of the pairing parameters may follow strategies dependent on the combined services' demand:
 Superset of all service defining parameters
 Min subset of all service defining parameters
 Max throughput mediated value The number of bearers combined in a pairing group may be larger than 2:
 E.g. one full rate at interval x plus two half rate at interval 2× mapped to odd and even intervals;
 E.g. one premium service getting perfect match, plus one or more BE services to fill the gaps;
 E.g. one premium service with low rate, plus one or more higher rate BE services requesting now and then an additional burst to empty its queue.

Figure 6:
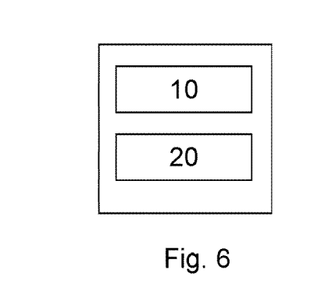
FIG. 6 shows an apparatus according to an embodiment of the invention.
Figure 7:
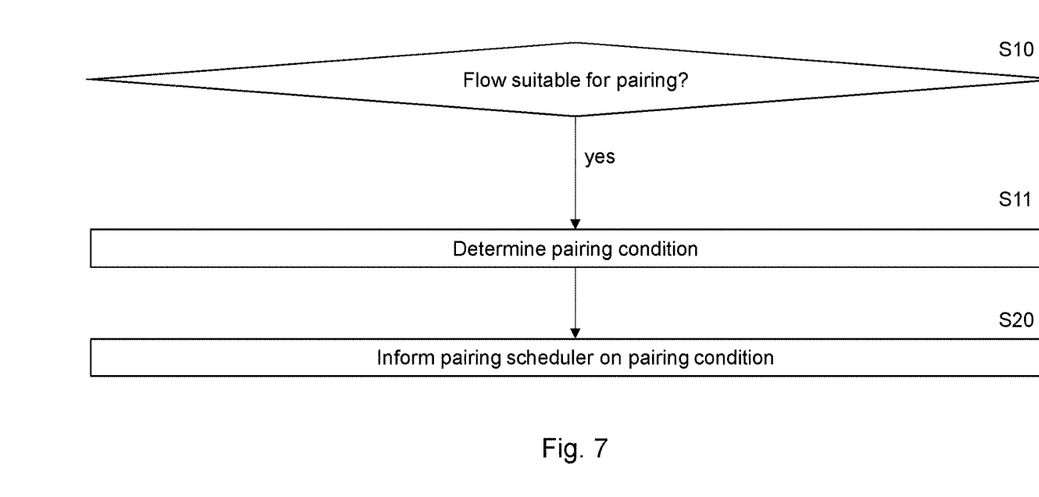
FIG. 7 shows a method according to an embodiment of the invention.

FIG. 6 shows an apparatus according to an embodiment of the invention. The apparatus may be a TD scheduler or an element thereof. FIG. 7 shows a method according to an embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for determining 10 and means for informing 20. The means for determining 10 and means for informing 20 may be a determining means and informing means, respectively. The means for determining 10 and means for informing 20 may be a determiner and informer, respectively. The means for determining 10 and means for informing 20 may be a determining processor and informing processor, respectively.

The means for determining 10 determines whether or not a flow is suitable for pairing (S10). If the flow is suitable for pairing (S10="yes"), the means for determining determines a pairing condition under which the flow is suitable for pairing (S11). In some example embodiments, S10 and S11 may be performed in a different sequence. I.e., the means for determining 10 may attempt to determine a pairing condition (S11). If the means for determining 10 cannot determine a pairing condition, the means for determining 10 determines that the flow is not suitable for pairing (S10).

If the flow is suitable for pairing (S10="yes"), the means for informing 20 informs a pairing scheduler on the pairing condition (S20).

Figure 8:
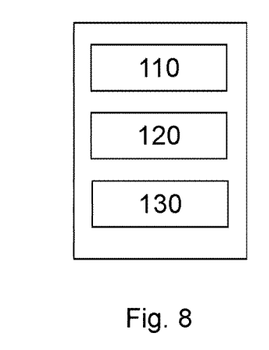
FIG. 8 shows an apparatus according to an embodiment of the invention.
Figure 9:
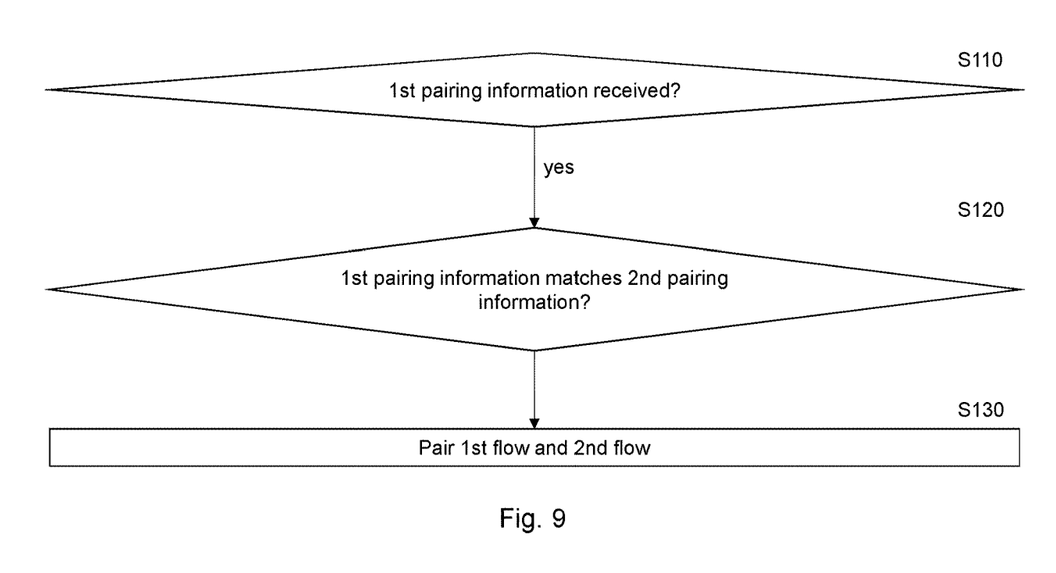
FIG. 9 shows a method according to an embodiment of the invention.

FIG. 8 shows an apparatus according to an embodiment of the invention. The apparatus may be a pairing scheduler or an element thereof. The pairing scheduler may be embedded in a FD/SD scheduler or separated therefrom. FIG. 9 shows a method according to an embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for monitoring 110, means for checking 120, and means for pairing 130. The means for monitoring 110, means for checking 120, and means for pairing 130 may be a monitoring means, checking means, and pairing means, respectively. The means for monitoring 110, means for checking 120, and means for pairing 130 may be a monitor, checker, and a pairing device respectively. The means for monitoring 110, means for checking 120, and means for pairing 130 may be a monitoring processor, checking processor, and pairing processor, respectively.

The means for monitoring 110 monitors if an information on a first pairing condition is received (S110). The first pairing condition indicates that a first flow is suitable for pairing under the first pairing condition. The first pairing condition may be received from a TD scheduler of the first flow.

If the information on the first pairing condition is received (S110="yes"), the means for checking 120 checks, for at least one of one or more stored second pairing conditions, if the respective stored second pairing condition matches the first pairing condition (S120). Each of the one or more second pairing conditions indicates that a respective second flow is suitable for the pairing under the respective second pairing condition. Each of the second flows is different from the first flow. The one or more stored second pairing conditions may be received previously from respective TD schedulers. Preferably, the means for checking checks for each of the one or more stored second pairing conditions, if the respective stored second pairing condition matches the first pairing condition.

If the second pairing condition related to one of the second flows matches the first pairing condition (S120="yes"), the means for pairing 130 pairs the first flow and the one of the second flows (S130). In detail, the means for pairing 130 may instruct the TD schedulers of the first flow and the one of the second flows and the FD/SD scheduler to schedule these flows such that they are paired (transmitted on the same time and frequency resource).

Figure 10:
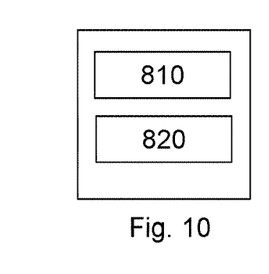
FIG. 10 shows an apparatus according to an embodiment of the invention.

FIG. 10 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 7 and 9 and related description.

Some example embodiments are described hereinabove, wherein the pairing scheduler is integrated with a FD/SD scheduler. However, the pairing scheduler may be implemented stand-alone. Also, instead of a combined FD/SD scheduler, only one of these schedulers may be implemented, or the FD scheduler may be separated from the SD scheduler. In such example embodiments, if the pairing scheduler is integrated, it may be integrated with any of the FD scheduler and the SD scheduler.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example, a TD scheduler, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a pairing scheduler, or a component thereof, an apparatus embodying the same, a method for controlling and/or operating the same, and computer program(s) controlling and/or operating the same as well as mediums carrying such computer program(s) and forming computer program product(s). The pairing scheduler may be embedded in a FD/SD scheduler or separate from any FD/SD scheduler.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus, comprising:
at least one processor; and
at least one non-transitory memory including computer program code, the at least one memory and the computer program code configured to, with the at least one processor, cause the apparatus to:
determine whether or not a flow is suitable for pairing and determine a pairing condition under which the flow is suitable for pairing;
inform a pairing scheduler on the pairing condition if the flow is suitable for pairing, wherein the pairing condition comprises a time budget indicating a time by which a transmission of packets of the flow may be shifted for the pairing, wherein the time budget is defined based on end-to-end delay allowed under quality of service (QOS) specification; and receive, from the pairing scheduler, a notification that the flow is to be paired with another flow, in response to, by the pairing scheduler:

monitoring if an information on a first pairing condition is received, wherein the first pairing condition indicates that a first flow is suitable for pairing under the first pairing condition, checking, if the information on the first pairing condition is received, for at least one of one or more stored second pairing conditions, if the respective stored second pairing condition matches the first pairing condition, wherein each of the one or more second pairing conditions indicates that a respective second flow different from the first flow is suitable for the pairing under the respective second pairing condition, pairing the first flow and one of the second flows if the second pairing condition related to the one of the second flows matches the first pairing condition, wherein the first pairing condition comprises a time budget indicating a time by which a transmission of packets of the flow may be shifted for the pairing, wherein the time budget is defined based on end-to-end delay allowed under quality of service (Qos) specification, and wherein the pairing comprises adapting a transmission timing of packets of one of the first flow and the one of the second flows in order to synchronize a transmission of the packets of the first flow and the packets of the one of the second flows if the second pairing condition related to the one of the second flows matches the first pairing condition, storing the received first pairing condition, monitoring if an information on a third pairing condition is received, wherein the third pairing condition indicates that a third flow is suitable for pairing under the third pairing condition, checking, for at least one of the one or more stored second pairing conditions or the stored first pairing condition, if the respective stored second pairing condition or the first pairing condition matches the third pairing condition, and pairing the third flow and one of the second flows and the first flow if the second pairing condition related to the one of the second flows or the first pairing condition, respectively, matches the third pairing condition.

2. The apparatus according to claim 1, wherein the at least one memory and the computer program code are configured to, with the at least one processor, cause the apparatus to use at least one of deep packet inspection of a packet of the flow or artificial intelligence to estimate a traffic pattern of the flow and to determine at least one of if the flow is suitable for the pairing or the pairing condition based on the estimated traffic pattern.

3. The apparatus according to claim 1, wherein the at least one memory and the computer program code are configured to, with the at least one processor, cause the apparatus to determine if the flow is suitable for the pairing and the pairing condition based on an indicated quality of the flow.

4. Apparatus, comprising:
at least one processor; and
at least one non-transitory memory including computer program code, the at least one memory and the computer program code configured to, with the at least one processor, cause the apparatus to:

monitor if an information on a first pairing condition is received, wherein the first pairing condition indicates that a first flow is suitable for pairing under the first pairing condition;

check, if the information on the first pairing condition is received, for at least one of one or more stored second pairing conditions, if the respective stored second pairing condition matches the first pairing condition, wherein each of the one or more second pairing conditions indicates that a respective second flow different from the first flow is suitable for the pairing under the respective second pairing condition;

pair the first flow and one of the second flows if the second pairing condition related to the one of the second flows matches the first pairing condition, wherein the first pairing condition comprises a time budget indicating a time by which a transmission of packets of the flow may be shifted for the pairing, wherein the time budget is defined based on end-to-end delay allowed under quality of service (QOS) specification, and wherein the pairing comprises adapting a transmission timing of packets of one of the first flow and the one of the second flows in order to synchronize a transmission of the packets of the first flow and the packets of the one of the second flows if the second pairing condition related to the one of the second flows matches the first pairing condition;

store the received first pairing condition;

monitor if an information on a third pairing condition is received, wherein the third pairing condition indicates that a third flow is suitable for pairing under the third pairing condition;

check, for at least one of the one or more stored second pairing conditions or the stored first pairing condition, if the respective stored second pairing condition or the first pairing condition matches the third pairing condition; and pair the third flow and one of the second flows and the first flow if the second pairing condition related to the one of the second flows or the first pairing condition, respectively, matches the third pairing condition.

5. The apparatus according to claim 4, wherein the at least one memory and the computer program code are configured to, with the at least one processor, cause the apparatus to inhibit breaking the pairing of the first flow and the one of the second flows until at least one of:

a channel condition of the first flow,
a channel condition of the second flow,
a service usage invoking the first flow,
a service usage invoking the second flow,
a mobility situation of a user owing the first flow, or
a mobility situation of a user owing the second flow changes by more than a respective predetermined lower threshold.

6. The apparatus according to claim 4, wherein the at least one memory and the computer program code are configured to, with the at least one processor, cause the apparatus to check that the second pairing condition related to the one of the second flows matches the first pairing condition if at least one of the following criteria is fulfilled or if a deviation for at least one of the criteria is less than a respective predefined threshold:

time and frequency resources for transmitting the first flow and the second flow overlap sufficiently;

paths for transmitting the first flow and the second flow are orthogonal;

time budgets to align the queues of the first and second flows are sufficient such that packets of the first flow and the second flow can be scheduled in the same time resource, or     a throughput for each bearer in its orthogonal paths for transmitting the first flow and the second flow is sufficient.

7. The apparatus according to claim 6, wherein, for all of the criteria, the deviation is less than the respective predefined threshold.

8. The apparatus according to claim 4, integrated with at least one of a frequency division scheduler or a spatial division scheduler.

9. Method, comprising:

determining whether or not a flow is suitable for pairing and determining a pairing condition under which the flow is suitable for pairing, wherein the pairing condition comprises a time budget indicating a time by which a transmission of packets of the flow may be shifted for the pairing, wherein the time budget is defined based on end-to-end delay allowed under quality of service (QOS) specification;

informing a pairing scheduler on the pairing condition if the flow is suitable for pairing; and     receiving, from the pairing scheduler, a notification that the flow is to be paired with another flow, in response to, by the pairing scheduler:

monitoring if an information on a first pairing condition is received, wherein the first pairing condition indicates that a first flow is suitable for pairing under the first pairing condition,         checking, if the information on the first pairing condition is received, for at least one of one or more stored second pairing conditions, if the respective stored second pairing condition matches the first pairing condition, wherein each of the one or more second pairing conditions indicates that a respective second flow different from the first flow is suitable for the pairing under the respective second pairing condition, and         pairing the first flow and one of the second flows if the second pairing condition related to the one of the second flows matches the first pairing condition, wherein the first pairing condition comprises a time budget indicating a time by which a transmission of packets of the flow may be shifted for the pairing, and wherein the pairing comprises adapting a transmission timing of packets of one of the first flow and the one of the second flows in order to synchronize a transmission of the packets of the first flow and the packets of the one of the second flows if the second pairing condition related to the one of the second flows matches the first pairing condition,     storing the received first pairing condition,     monitoring if an information on a third pairing condition is received, wherein the third pairing condition indicates that a third flow is suitable for pairing under the third pairing condition,     checking, for at least one of the one or more stored second pairing conditions or the stored first pairing condition, if the respective stored second pairing condition or the first pairing condition matches the third pairing condition, and     pairing the third flow and one of the second flows and the first flow if the second pairing condition related to the one of the second flows or the first pairing condition, respectively, matches the third pairing condition.

10. The method according to claim 9, further comprising using at least one of deep packet inspection of a packet of the flow or artificial intelligence to estimate a traffic pattern of the flow; wherein the determining of at least one of if the flow is suitable for the pairing and the pairing condition is based on the estimated traffic pattern.

11. The method according to claim 9, wherein the determining if the flow is suitable for the pairing and the pairing condition is based on an indicated quality of the flow.

12. Method, comprising:

monitoring if an information on a first pairing condition is received, wherein the first pairing condition indicates that a first flow is suitable for pairing under the first pairing condition;

checking, if the information on the first pairing condition is received, for at least one of one or more stored second pairing conditions, if the respective stored second pairing condition matches the first pairing condition, wherein each of the one or more second pairing conditions indicates that a respective second flow different from the first flow is suitable for the pairing under the respective second pairing condition; and     pairing the first flow and one of the second flows if the second pairing condition related to the one of the second flows matches the first pairing condition, wherein the first pairing condition comprises a time budget indicating a time by which a transmission of packets of the flow may be shifted for the pairing, and wherein the pairing comprises adapting a transmission timing of packets of one of the first flow and the one of the second flows in order to synchronize a transmission of the packets of the first flow and the packets of the one of the second flows if the second pairing condition related to the one of the second flows matches the first pairing condition;

storing the received first pairing condition;

monitoring if an information on a third pairing condition is received, wherein the third pairing condition indicates that a third flow is suitable for pairing under the third pairing condition;

checking, for at least one of the one or more stored second pairing conditions or the stored first pairing condition, if the respective stored second pairing condition or the first pairing condition matches the third pairing condition; and     pairing the third flow and one of the second flows and the first flow if the second pairing condition related to the one of the second flows or the first pairing condition, respectively, matches the third pairing condition.

13. The method according to claim 12, further comprising inhibiting breaking the pairing of the first flow and the one of the second flows until at least one of:

a channel condition of the first flow, a channel condition of the second flow, a service usage invoking the first flow,
a service usage invoking the second flow,
a mobility situation of a user owing the first flow, or
a mobility situation of a user owing the second flow changes by more than a respective predetermined lower threshold.

14. The method according to claim 12, wherein:
the checking that the second pairing condition related to the one of the second flows matches the first pairing condition is in response to at least one of the following criteria being fulfilled or in response to a deviation for at least one of the criteria being less than a respective predefined threshold:
time and frequency resources for transmitting the first flow and the second flow overlap sufficiently;
paths for transmitting the first flow and the second flow are orthogonal;
time budgets to align the queues of the first and second flows are sufficient such that packets of the first flow and the second flow can be scheduled in the same time resource, or
a throughput for each bearer in its orthogonal paths for transmitting the first flow and the second flow is sufficient.

15. The method according to claim 14, wherein, for all of the criteria, the deviation is less than the respective predefined threshold.

16. A computer program product comprising a non-transitory computer readable medium encoded with a set of instructions which, when executed on an apparatus, is configured to cause the apparatus to:
determining whether or not a flow is suitable for pairing and determining a pairing condition under which the flow is suitable for pairing, wherein the pairing condition comprises a time budget indicating a time by which a transmission of packets of the flow may be shifted for the pairing, wherein the time budget is defined based on end-to-end delay allowed under quality of service (QOS) specification;
informing a pairing scheduler on the pairing condition if the flow is suitable for pairing; and
receiving, from the pairing scheduler, a notification that the flow is to be paired with another flow, in response to, by the pairing scheduler:
monitoring if an information on a first pairing condition is received, wherein the first pairing condition indicates that a first flow is suitable for pairing under the first pairing condition,
checking, if the information on the first pairing condition is received, for at least one of one or more stored second pairing conditions, if the respective stored second pairing condition matches the first pairing condition, wherein each of the one or more second pairing conditions indicates that a respective second flow different from the first flow is suitable for the pairing under the respective second pairing condition, and
pairing the first flow and one of the second flows if the second pairing condition related to the one of the second flows matches the first pairing condition, wherein the first pairing condition comprises a time budget indicating a time by which a transmission of packets of the flow may be shifted for the pairing, and wherein the pairing comprises adapting a transmission timing of packets of one of the first flow and the one of the second flows in order to synchronize a transmission of the packets of the first flow and the packets of the one of the second flows if the second pairing condition related to the one of the second flows matches the first pairing condition,
storing the received first pairing condition,
monitoring if an information on a third pairing condition is received, wherein the third pairing condition indicates that a third flow is suitable for pairing under the third pairing condition,
checking, for at least one of the one or more stored second pairing conditions or the stored first pairing condition, if the respective stored second pairing condition or the first pairing condition matches the third pairing condition, and
pairing the third flow and one of the second flows and the first flow if the second pairing condition related to the one of the second flows or the first pairing condition, respectively, matches the third pairing condition.

* * * * *